United States Patent
van Nee

(10) Patent No.: US 8,155,138 B2
(45) Date of Patent: Apr. 10, 2012

(54) TRAINING SEQUENCES FOR VERY HIGH THROUGHPUT WIRELESS COMMUNICATION

(75) Inventor: Richard van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 12/365,802

(22) Filed: Feb. 4, 2009

(65) Prior Publication Data

US 2010/0046358 A1 Feb. 25, 2010

Related U.S. Application Data

(60) Provisional application No. 61/090,134, filed on Aug. 19, 2008.

(51) Int. Cl.
*H04B 7/212* (2006.01)
(52) U.S. Cl. ........................ 370/442; 375/219
(58) Field of Classification Search .............. 370/442, 370/208, 203, 210, 334; 375/219, 229, 255, 375/316
See application file for complete search history.

(56) References Cited

U.S. PATENT DOCUMENTS

| | | | | |
|---|---|---|---|---|
| 7,116,271 B2 * | 10/2006 | Kostanic et al. | ............ | 342/378 |
| 2002/0085620 A1 * | 7/2002 | Mesecher | ............ | 375/130 |
| 2004/0179627 A1 * | 9/2004 | Ketchum et al. | ............ | 375/267 |
| 2005/0152357 A1 * | 7/2005 | Stephens | ............ | 370/389 |
| 2005/0180360 A1 * | 8/2005 | Hansen et al. | ............ | 370/334 |
| 2006/0227892 A1 * | 10/2006 | Ouyang et al. | ............ | 375/267 |
| 2007/0064735 A1 * | 3/2007 | Hoo et al. | ............ | 370/468 |
| 2007/0253501 A1 | 11/2007 | Yamaura | | |
| 2007/0253505 A1 * | 11/2007 | Kostanic | ............ | 375/267 |
| 2008/0101942 A1 * | 5/2008 | McGowan et al. | ........ | 416/223 R |
| 2008/0192846 A1 * | 8/2008 | Bjerke et al. | ............ | 375/260 |

FOREIGN PATENT DOCUMENTS

| WO | WO2004038988 | 5/2004 |
|---|---|---|
| WO | WO2010021900 | 2/2010 |

OTHER PUBLICATIONS

International Search Report and Written Opinion—PCT/US2009/053491, International Search Authority—European Patent Office Jul. 23, 2010.

* cited by examiner

*Primary Examiner* — Gary Mui
(74) *Attorney, Agent, or Firm* — Kenyon S. Jenckes

(57) ABSTRACT

Methods and systems for communications that generate a plurality of spatial streams, wherein each of the spatial streams comprises a data packet with a training sequence; and multiply at least a portion of the training sequence in each of the spatial streams with a different spreading sequence. Methods and systems that receive a plurality of spatial streams, wherein each of the spatial streams comprises a data packet with a training sequence; multiply at least a portion of the training sequence in each of the spatial streams with a different spreading sequence; and decode the plurality of spatial streams based on the different spreading sequences.

13 Claims, 2 Drawing Sheets

TRAINING SEQUENCES FOR VERY HIGH THROUGHPUT WIRELESS COMMUNICATION

CROSS-REFERENCE TO RELATED APPLICATIONS

Claim of Priority Under 35 U.S.C. §119

The present Application for Patent claims priority to Provisional Application No. 61/090,134, entitled "MODIFIED STF AND LTF FOR ACCURATE VHT AGC POWER SETTING" filed Aug. 19, 2008, and assigned to the assignee hereof and hereby expressly incorporated by reference herein.

BACKGROUND

I. Field

The following description relates generally to communication systems, and more particularly to modified training fields for automatic gain control power settings.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

A new version of 802.11 called Very High Throughput (VHT), employs MIMO to communicate with several receivers using Spatial-Division Multiple Access (SDMA). SDMA is a multiple access scheme which enables multiple streams transmitted to different receivers at the same time to share the same frequency spectrum. Within any given stream, there may be significant variations in power which could lead to large Automatic Gain Control (AGC) errors. Techniques to deal with such power variations are needed in the art.

SUMMARY

In one aspect of the disclosure, an apparatus for communications includes a processing system configured to generate a plurality of spatial streams, wherein each of the spatial streams comprises a data packet having a training sequence. The processing system is further configured to multiply at least a portion of the training sequence in each of the spatial streams with a different spreading sequence.

In another aspect of the disclosure, a method for communications includes generating a plurality of spatial streams, wherein each of the spatial streams comprises a data packet having a training sequence. The method further includes multiplying at least a portion of the training sequence in each of the spatial streams with a different spreading sequence.

In yet another aspect of the disclosure, an apparatus for communications includes means for generating a plurality of spatial streams, wherein each of the spatial streams comprises a data packet having a training sequence. The apparatus further includes means for multiplying at least a portion of the training sequence in each of the spatial streams with a different spreading sequence.

In a further aspect of the disclosure, a computer-program product for wireless communication includes a machine-readable medium encoded with instructions executable to generate a plurality of spatial streams, wherein each of the spatial streams comprises a data packet having a training sequence, and multiply at least a portion of the training sequence in each of the spatial streams with a different spreading sequence.

In yet another aspect of the disclosure, an access point includes a wireless network adapter configured to support a backhaul connection for a peer node to a network; and a processing system. The processing system is configured to generate a plurality of spatial streams, wherein each of the spatial streams comprises a data packet having a training sequence. The processing system is further configured to multiply at least a portion of the training sequence in each of the spatial streams with a different spreading sequence.

In yet another aspect, an apparatus for communications includes a processing system configured to receive a plurality of spatial streams, wherein each of the spatial streams comprises a data packet having a training sequence, and wherein at least a portion of the training sequence in each of the spatial streams is multiplied with a different spreading sequence. The processing system is further configured to decode the plurality of spatial streams based on the different spreading sequences.

In yet another aspect of the disclosure, a method for communications includes receiving a plurality of spatial streams, wherein each of the spatial streams comprises a data packet having a training sequence, and wherein at least a portion of the training sequence in each of the spatial streams is multiplied with a different spreading sequence. The method further includes decoding the plurality of spatial streams based on the different spreading sequences.

In a further aspect of the disclosure, an apparatus for communications includes means for receiving a plurality of spatial streams, wherein each of the spatial streams comprises a data packet having a training sequence, and wherein at least a portion of the training sequence in each of the spatial streams is multiplied with a different spreading sequence, and means for decoding the plurality of spatial streams based on the different spreading sequences.

In yet a further aspect of the disclosure, a computer-program product for communication includes a machine-readable medium encoded with instructions executable to receive a plurality of spatial streams, wherein each of the spatial streams comprises a data packet having a training sequence, and wherein at least a portion of the training sequence in each of the spatial streams is multiplied with a different spreading sequence; and decode the plurality of spatial streams based on the different spreading sequences.

In yet another further aspect of the disclosure, an access terminal includes a processing system and a user interface supported by the processing system. The processing systems is configured to receive a plurality of spatial streams, wherein each of the spatial streams comprises a data packet having a training sequence, and wherein at least a portion of the training sequence in each of the spatial streams is multiplied with a different spreading sequence. The processing system is further configured to decode the plurality of spatial streams based on the different spreading sequences.

BRIEF DESCRIPTION OF THE DRAWINGS

These and other sample aspects of the invention will be described in the detailed description that follow, and in the accompanying drawings, wherein.

Figure 1:
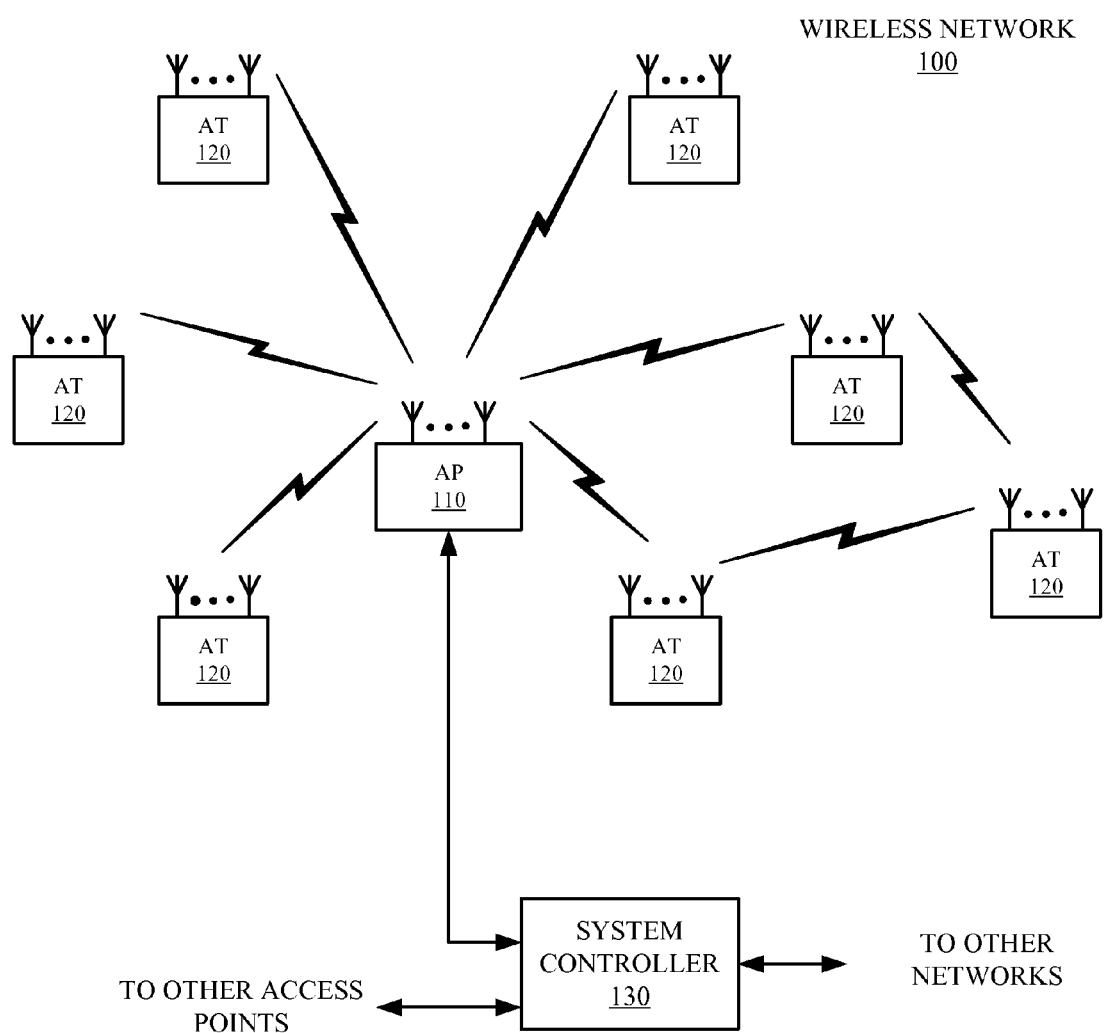
FIG. 1 is a conceptual diagram illustrating an example of a wireless communications network.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the invention are described more fully hereinafter with reference to the accompanying drawings. This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein, one skilled in the art should appreciate that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Several aspects of a wireless network will now be presented with reference to FIG. 1. The wireless network 100 is shown with several wireless nodes, generally designated as nodes 110 and 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage, however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using SDMA. As explained in the background section of this disclosure, SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream.

One or more access terminals 120 may be equipped with multiple antennas to enable certain functionality. With this configuration, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard.

Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

Figure 2:
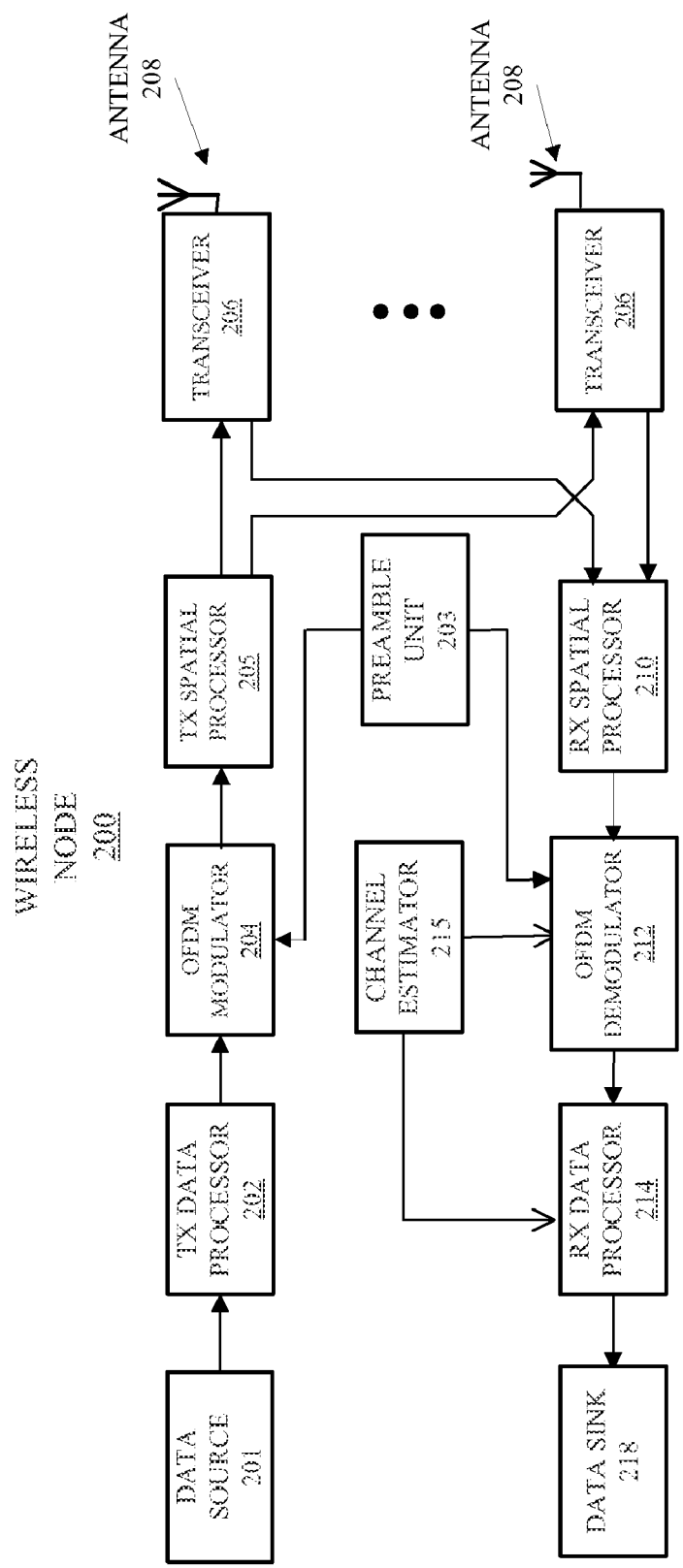
FIG. 2 is a block diagram illustrating an example of a wireless node.

FIG. 2 is a conceptual block diagram illustrating an example of a wireless node. In a transmit mode, a TX data processor 202 may be used to receive data from a data source 201 and encode (e.g., Turbo code) the data to facilitate forward error correction (FEC) at the receiving node. The encoding process results in a sequence of code symbols that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator 204 splits the modulation symbols into a number of parallel streams and then maps each stream to a subcarrier using some modulation constellation. An Inverse Fast Fourier Transform (IFFT) is then performed on each set of subcarriers to produce time domain OFDM symbols, with each OFDM symbol having a set of subcarriers. The OFDM symbols are distributed in the payloads of multiple data packets.

In at least one configuration of a wireless node 200, a preamble is carried along with the payload in each data packet. The preamble may be comprised of several symbols which are provided to the OFDM modulator 204 by a preamble unit 203. The OFDM modulator 204 splits the preamble symbols into a number of parallel streams, and then maps each stream to a subcarrier using some modulation constellation. An IFFT is then performed on each set of subcarriers to produce one or more time domain OFDM symbols which constitutes the preamble. The preamble is then appended to payload carried by each data packet before providing the data packets to a TX spatial processor 205.

A TX spatial processor 205 performs spatial processing on the data packets. This may be accomplished by spatially precoding the data packets into a number of spatially precoded streams and then providing each spatially precoded stream to a different antenna 208 via a transceiver 206. Each transceiver 206 modulates an RF carrier with a respective precoded stream for transmission over the wireless channel.

In a receive mode, each transceiver 206 receives a signal through its respective antenna 208. Each transceiver 206 may be used to recover the information modulated onto an RF carrier and provide the information to a RX spatial processor 210.

The RX spatial processor 210 performs spatial processing on the information to recover data packets carried any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique.

The preamble unit 203 will use the preamble in each data packet to provide synchronization information to the OFDM demodulator 212. The OFDM demodulator 212 recovers the data carried on each subcarrier in the OFDM symbols in the payload of the data packet and multiplexes the data into a stream of modulation symbols. The OFDM demodulator 212 converts the stream from time-domain to the frequency domain using a Fast Fourier Transfer (FFT). The frequency domain signal comprises a separate stream for each subcarrier.

The channel estimator 215 receives the streams from the OFDM demodulator and estimates the channel response. As part of the preamble there may be a set of pilot signals. Each pilot signal will be generally shifted in phase due to the transmission through the wireless channel. The MMSE estimates of the phase shifted pilot signals are computed and the MMSE estimates are used to estimate phase errors and consequently the channel response. The channel response is provided to the RX data processor 214.

The RX data processor 214 is used to translate the modulation symbols back to the correct point in the signal constellation. Because of noise and other disturbances in the wireless channel, the modulation symbols may not correspond to an exact location of a point in the original signal constellation. Using the channel response, the RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs and the phase error estimates in order to decode the data that was originally transmitted before providing the data to a data sink 218.

A preamble within each data packet includes a training sequence. A training sequence contains a number of modulated symbols. A training sequence may comprise a Short Training Field (STF) and/or a Long Training Field (LTF). The preamble unit 203 together with the OFDM modulator 204 creates preambles according to the following mechanisms. In one mechanism, the preambles are generated by multiplying at least a portion of the training sequence (such as the STF or the LTF) in each of the data packets with a different spreading sequence. The spreading sequences may be an orthogonal sequence. A cyclic delay (CD) or cyclic delay diversity (CCD) may be applied to one or more of the different spreading sequences. Furthermore, each of the training sequences may have nonzero subcarriers, and each of the different spreading sequences may have k values.

When the number of data packets is m, at least a portion of the training sequence in each of the data packets is multiplied with a portion of an m×k matrix including the different spreading sequences. The matrix may be a Hadamard matrix. Alternatively, at least a portion of the training sequence in each of the data packets may be multiplied with an FFT matrix comprising the different spreading sequences. The following illustrates a few examples detailing some of the above mentioned configurations.

In one configuration, an 800 ns repetition interval is maintained. This will allows many of the versions of 802.11 perform auto correlation detection to detect the new preambles presented here. Basically, any receiver that can detect 802.11n-GF with a possible CD spread of 600 ns, will likely be able to detect the new preambles. As such, the new preambles presented here can be used as a mixed-mode type of preamble. The preambles may be obtained by multiplying the STF subcarriers of each stream with a different sequence. For example, length 24 Hadamard sequences for 24 non-zero subcarriers of a 40 MHZ STF may be used. In this case, the STF subcarriers k for transmission m are defined as:

$$s_{mk} = W_{mk} s_k$$

Where $s_k$ are the 24 non-zero subcarrier values of the 802.11n STF symbol and wmk are +1/−1 values from the 24×24 orthogonal Hadamard matrix.

For 20 MHZ, where there may be only 12 orthogonal length-12 sequences, to support more than 12 spatial streams, a combination of length-12 sequences and CDD may be used. In this case, the STF subcarriers k for transmission m are defined as:

$$s_{mk} = w_{mk} s_k$$

Where $s_k$ are the 12 non-zero subcarrier values of the 802.11n STF symbol for a 20 MHz channel and $w_{mk}$ are +1/−1 values from the 12×12 orthogonal Hadamard matrix. In addition to the multiplication by the Hadamard sequences, a cyclic delay value of −200 ns is applied to the transmitters 13-16. Other CD values may also be possible.

In another configuration, the LTF subcarriers of each transmission are multiplied with a different near orthogonal sequence. For a number of non-zero subcarriers used in 802.11n, there may not be known binary orthogonal patterns. However, it would be possible to use complex orthogonal patterns such as the rows of a 114×114 FFT matrix for the case of 114 non-zero subcarriers. It is also possible to apply near orthogonal binary codes by using the first 114 rows and columns of the 128×128 Hadamard matrix. The above preamble has a long repetition time and therefore allows for more diverse CDD values. The above preamble allows to further reduce the correlation between different transmitters.

The above schemes for obtaining Training Sequences for Very High Throughput Wireless Communications are not highly dependent on specific phase relations between the transmitters. The Training Sequences for Very High Throughput Wireless Communications may have similar repetition intervals as those in systems such as 802.11n. Also, they can be detected by legacy 802.11n receivers.

It is understood that any specific order or hierarchy of steps described above is being presented to provide an example of the process involved in the preamble unit. Based upon design preferences, it is understood that the specific order or hierarchy of steps may be rearranged while remaining within the scope of the invention.

The preamble unit, the modulation unit, and the demodulation may be implemented with one or more general purpose processors, digital signal processors (DSP)s, application specific integrated circuits (ASIC)s, field programmable gate array (FPGA)s, programmable logic devices (PLD)s, other programmable logic components, discrete gate or transistor logic, discrete hardware components, or any combination thereof designed to perform the functions described herein. A general purpose processor may be a microprocessor, a controller, a microcontroller, a state machine, or any other circuitry that can execute software. Software shall be construed broadly to mean instructions, data, or any combination thereof, whether referred to as software, firmware, middleware, microcode, hardware description language, or otherwise. Software may be stored on machine-readable media or embedded in one or more components such as a DSP or ASIC. Machine-readable media may include various memory components including, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Machine-readable media may also be include a transmission line, a carrier wave modulated by data, and/or other means for providing software to the wireless node. The machine-readable may be embodied in a computer-program product. The computer-program product may comprise packaging materials.

Whether the above mentioned units are implemented in hardware, software, or a combination thereof will depend upon the particular application and design constraints imposed on the overall system. Skilled artisans may implement the described functionality in varying ways for each particular application, but such implementation decisions should not be interpreted as causing a departure from the scope of the invention.

The previous description is provided to enable any person skilled in the art to fully understand the full scope of the invention. Modifications to the various configurations disclosed herein will be readily apparent to those skilled in the art. Thus, the claims are not intended to be limited to the various aspects of the invention described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for communications, comprising:
    means for receiving a plurality of spatial streams, wherein each of the spatial streams comprises a data packet having a training sequence, wherein at least a portion of the training sequence in each of the spatial streams is multiplied with a different spreading sequence; and
    means for decoding the plurality of spatial streams based on the different spreading sequences.

2. The apparatus of claim 1 wherein each of the training sequences comprises a plurality of subcarriers, and wherein the subcarriers of said at least a portion of the training sequence in each of the spatial streams are multiplied with a different spreading sequence.

3. The apparatus of claim 1 wherein each of the spreading sequences comprises an orthogonal sequence.

4. The apparatus of claim 1 wherein one or more of the different spreading sequences comprise a cyclic delay.

5. The apparatus of claim 1 wherein each of the training sequences comprises k nonzero subcarriers.

6. The apparatus of claim 5 wherein each of the different spreading sequences comprises k values.

7. The apparatus of claim 5 wherein the spatial streams comprise m spatial streams, and wherein said at least a portion of the training sequence in each of the spatial streams are multiplied with a portion of an m×k matrix comprising the different spreading sequences.

8. The apparatus of claim 7 wherein each of the training sequences comprises a plurality of subcarriers, and wherein the subcarriers of said at least a portion of the training sequence in each of the spatial streams are multiplied with said portion of the m×k matrix comprising the different spreading sequences.

9. The apparatus of claim 8 wherein the matrix comprises a Hadamard matrix.

10. The apparatus of claim 5 said at least a portion of the training sequence in each of the spatial streams is multiplied with a portion of a Hadamard matrix comprising the different spreading sequences.

11. The apparatus of claim 5 wherein said at least a portion of the training sequence in each of the spatial streams is multiplied with a FFT matrix comprising the different spreading sequences.

12. The apparatus of claim 1 wherein the means for receiving is configured to receive each of the spatial streams via a different one of a plurality of antennas.

13. The apparatus of claim 1 further comprising means for using each of the training sequences to correct digital gain.

* * * * *